2,997,454
POLYVINYL CHLORIDE STABILIZER COMBINATIONS OF PHOSPHORUS ACID WITH TRIPHOSPHITES AND HEAVY METAL SALTS
William E. Leistner, Brooklyn, Arthur C. Hecker, Forest Hills, and Olga H. Knoepke, Brooklyn, N.Y., assignors to Argus Chemical Corporation, a corporation of New York
No Drawing. Filed May 18, 1959, Ser. No. 813,618
21 Claims. (Cl. 260—45.8)

This invention relates to new stabilizer compositions for polyvinyl chloride resins and to polyvinyl chloride resin compositions having an improved color, better clarity, and less plate-out, incorporating such stabilizer compositions.

U.S. Patent No. 2,564,646 to Leistner, Hecker and Knoepke suggests the stabilization of polyvinyl chloride resins using a heavy metal salt of a higher fatty acid and with this stabilizer there is also incorporated an organic phosphite which serves as an anti-clouding agent retarding precipitation of metal halide from the stabilizer resin composition as a cloud or haze in the stock. The phosphites disclosed include primary, secondary and tertiary alkyl and aryl phosphites. Supplementing this disclosure it has also been disclosed by Leistner and Hecker in U.S. Patent No. 2,716,092 that an improved stabilizer is obtained using in combination with such phosphites polyvalent metal salts of hydrocarbon-substituted phenols. These compositions are now widely used for the stabilization of polyvinyl chloride resins against discoloration during processing and against blooming due to separation of ingredients from the resin.

It is now recognized that some triphosphites are better than others in affording protection against discoloration. Leistner, Hecker and Knoepke in Serial No. 584,891, filed May 15, 1956, of which this application is a continuation-in-part, have shown that the mixed alkyl aryl triphosphites are considerably better than the triaryl phosphites both alone and in their combinations with heavy metal fatty acid salts and metal phenolates. These findings have been confirmed by Hansen and Zaremsky in their later disclosure in Patent No. 2,867,594. It is also recognized that a further improvement is obtained by incorporating in such combinations epoxidized higher fatty acid esters.

Nonetheless, despite these developments, in many cases polyvinyl chloride resins in the course of compounding at elevated temperatures and before the compounded composition has been heated for any length of time develop a faint yellow color. This initial discoloration has not been considered disadvantageous heretofore for many uses, and the above-mentioned workers have consequently devoted their efforts to minimizing intensification of this discoloration during long heating, as in milling. However, because of this initial discoloration, it has not been possible in all cases to obtain a substantially clear and colorless polyvinyl chloride composition. Hansen et al., for example, in their patent mentioned above, regarded it as a considerable improvement when, as shown in Example 3, the resin turns only very light yellow after fifteen minutes of heating. Obviously, a considerable improvement would be had if it would be possible to obtain a resin which is still clear and has no noticeable yellowish or other discoloration after fifteen minutes of heating at temperatures of the order of 350° F. Even if such compositions proved less stable in long term heating, a composition not as stable as the prior compositons to extended heating at high temperatures would nonetheless have certain definite advantages if it were less discolored during short term heating at such temperatures.

In accordance with the instant invention it has been determined that polyvinyl chloride resin compositions of excellent initial color which show substantially no discoloration even after fifteen minutes of heating at 350° F. and below are obtainable if with the combination of triphosphite and metal salt stabilizer there is incorporated a phosphorus compound having at least one hydrogen atom of acidic character. By "acidic character," it is meant that the hydrogen is replaceable by a metal. Only very small amounts are required to achieve this improvement in stabilization against discoloration, and amounts within the range from 0.005 to 1 part per 100 parts of the resin are usually sufficient.

In addition to improved stabilization, the stabilizer compositions of the invention impart improved clarity, and less plate-out, i.e., less coating or adhesion to the rolls or molds. In fact, plate-out can be entirely eliminated by these compositions, particularly by certain organic phosphorus compounds, such as diphenyl phosphite.

The phosphorus acids in accordance with the invention can be defined by the following formula:

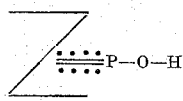

In this formula, phosphorus has a valence of three or five, the additional two valences being indicated by dotted line bonds. Typical phosphorus acids coming within this general formula are the following:

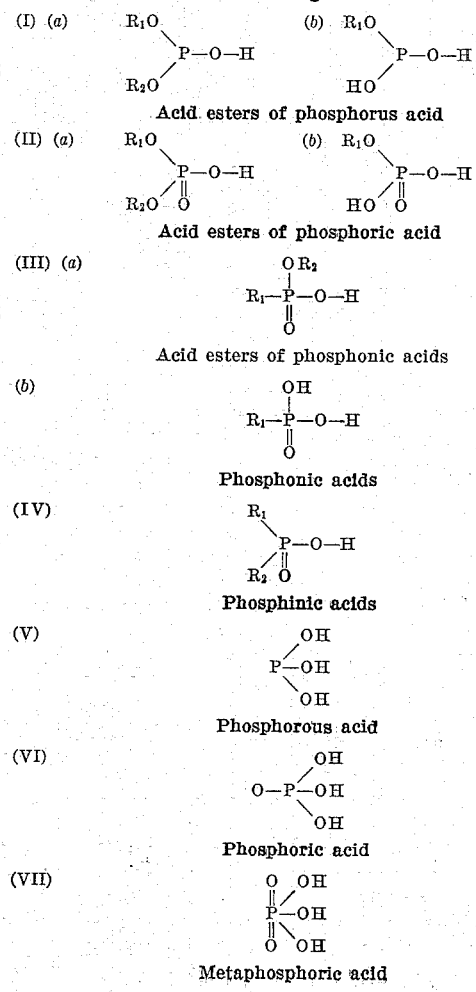

(VIII)

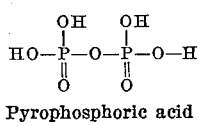

Pyrophosphoric acid

In the above formulae $R_1$ and $R_2$ represent an organic aliphatic, aromatic or nonaromatic alicyclic hydrocarbon or heterocyclic radical having from one to about thirty carbon atoms. $R_1$ and $R_2$ in I, II, III(a) and IV may be the same or different.

As exemplary of these acids, there are suggested the following: di(phenyl) phosphite, monophenyl phosphite, mono-(diphenyl) phosphite, dicresyl phosphite, di-(o-isooctylphenyl) phosphite, di(p-ethylhexlphenyl) phosphite, di(p-t-octylphenyl) phosphite, di(dimethylphenyl) phosphite, di-n-butyl phosphite, di-2-ethylhexyl phosphite, mono-2-ethyl hexyl phosphite, diisooctyl phosphite, monoisooctyl phosphite, monododecyl phosphite, 2-ethylhexyl phenyl phosphite, 2-ethylhexyl-(n-octylphenyl) phosphite, monocyclohexyl phosphite, dicyclohexyl phosphite, di(2-cyclohexyl phenyl) phosphite, di-α-naphthyl phosphite, dipenyl phenyl phosphite, di(diphenyl) phospite, di-(2-phenyl ethyl) phosphite, dibenzyl phosphite, monobenzyl phosphite, n-butyl cresyl phosphite, didodecyl phosphite, ditetrahydrofurfuryl phosphite, difuryl phosphite, diphenyl phosphate, monophenyl phosphate, dicresyl phosphate, di(dimetylphenyl) phosphate, di-n-butyl phosphate, di(p-t-octylphenyl) phosphate, di(o-t-octylphenyl) phosphate, di(2-ethylhexylphenyl) phosphate, di-2-ethylhexyl phosphate, mono-2-ethylhexyl phosphate, diisooctyl phosphate monoisooctyl phosphate, monododecyl phosphate, 2-ethylhexyl phenyl phosphate, 2-ethylhexyl-(p-t-octyl phenyl) phosphate, dicyclohexyl phosphate, monocyclohexyl phosphate, ditetrahydrofurfuryl phosphate, difuryl phosphate, di(2-cyclohexyl phenyl) phosphate, di-α-naphthyl phosphate, di(diphenyl) phosphate, diphenyl phenyl phosphate, di(2-phenyl ethyl( phosphate, dibenzyl phosphate, monobenzyl phosphate, n-butyl cresyl phosphate, didodecyl phosphate, benzene phosphonic acid, 2-ethylhexyl phosphonic acid, n-butyl phosphonic acid, isoamyl phosphonic acid, cyclohexyl phosphonic acid, α-naphthyl phosphonic acid, benzyl phosphonic acid, 2-phenylethyl phosphonic acid, tolyl phosphonic acid, 2-cyclohexyl phenyl phosphonic acid and diphenyl phosphonic acid, phenyl ethyl acid phosphonate, 2-ethylhexyl phenyl acid phosphonate, di(2-ethylhexyl) acid phosphonate, cresyl tolyl-acid phosphonate, di(phenyl) acid phosphonate, di(cyclohexyl) acid phosphonate, di(tetrahydrofurfuryl) acid phosphonate, diphenyl phosphinic acid, di-2-ethylhexyl phosphinic acid, di(t-octylphenyl) phosphinic acid, 2-ethylhexyl phenyl phosphinic acid, isobutyl-2-ethylhexyl phosphinic acid, di-n-propyl phosphinic acid, di-α-naphthyl phosphinic acid, dicyclohexyl phosphinic acid, ditolyl phosphinic acid, dibenzyl phosphinic acid, isooctyl benzyl phosphinic acid, di(2-phenyl ethyl) phosphinic acid, diphenyl phenyl phosphinic acid, di(diphenyl) phosphinic acid, 2-etylhexyl (t-octyl phenyl) phosphinic acid and di(dimethylphenyl) phosphinic acid.

It is thought that the effectiveness of these acids is associated with the acidity resulting from the presence of the acidic hydrogen atom. The presence of an organic radical is not essential, although this is of assistance in incorporating the stabilizers in the mix. In many cases acids having an organic radical in addition to the acidic hydrogen atom are preferred, but inorganic phosphorus acids such as phosphorous acid, phosphoric acid, metaphosphoric acid and pyrophosphoric acid also can be used. It is important, of course, that the phosphorus acid employed be stable under all conditions to which the polyvinyl chloride resin composition will be subjected in storage and in use.

The amount of the acid that is employed is not critical. Enough is used to improve the initial color of the resin. However, many of the acids tend themselves to impart discoloration to the resin when present in excessive amounts, and the amount used therefore should be less than this.

The acidity of the acid is a factor in the stabilizing effect of the acid, and more of the weaker acids must be used to obtain the stabilizing effect of a strong acid such as phosphoric acid. It is convenient, therefore, to gauge the amount required for optimum stabilization in terms of acidity with respect to phosphoric acid. Usually, an amount equivalent in acidity to about 0.005 to 0.05 part of phosphoric acid per 100 parts of resin will give a good stabilization. Expressed in terms of weight based on the resin, taking into account their lesser acidity, the proportion of phosphorus acid containing an organic radical can be within the range from 0.01 to 1 part per 100 parts of resin, adequate to improve the initial color and less than will impart discoloration to the resin.

In conjunction with the phosphorus acid there is also used an organic triphosphite. In these combinations, the triphosphite not only has the function of an anticlouding agent but also contributes to the stabilizing action of the phosphorus acid. These phosphites contain a total of three groups selected from aryl, alkyl, aralkyl, alkaryl, cycloaliphatic and heterocyclic groups having from one to twenty carbon atoms and from one to three heterocycloc atoms other than nitrogen. These groups may be present in any combination. Exemplary are triphenyl phosphite, tricresyl phosphite, tri(dimethylphenyl) phosphite, tri-n-butyl phosphite, triisooctyl phosphite, tridodecyl phosphite, diisooctyl phenyl phosphite, isooctyl diphenyl phosphite, tri(p-t-octylphenyl) phoshite, tri(p-t-nonylphenyl) phosphite, tri(p-t-nonyl-o-cresyl) phosphite, tribenzyl phosphite, isobutyl dicresyl phosphite, isooctyl di(p-t-octylphenyl) phosphite, tri(2-ethylhexyl) phosphite, tri(2-cyclohexylphenyl) phosphite, tri-alpha-naphthyl phosphite, tri(diphenyl) phosphite, tri(2-phenylethyl) phosphite, trifuryl phosphite, tritetrahydrofurfuryl phosphite, tricyclohexyl phosphite, and tricyclopentyl phosphite.

The metal salt stabilizer is a salt of a polyvalent metal and an organic acid having from six to eighteen carbon atoms. The acid should be monocarboxylic, and it should not contain nitrogen atoms in the molecule. Aliphatic, aromatic, alicyclic and oxygen-containing heterocyclic monocarboxylic acids are operative, as a class. The acids may be substituted, if desired, with groups such as halogen, sulfur and hydroxyl. The oxygen-containing heterocyclic acids include oxygen and carbon in the ring structure of which alkyl-substituted furoic acids are exemplary. As exemplary of the acids there can be mentioned the following: caproic acid, capric acid, 2-ethyl hexoic acid, lauric acid, chlorocaproic acid, hydroxy capric acid, stearic acid, palmitic acid, oleic acid, myristic acid, dodecyl thioether propionic acid

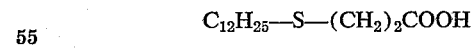

hexahydrobenzoic acid, benzoic acid, phenylacetic acid, isobutyl benzoic acid, monoethyl ester of phthalic acid, ethyl benzoic acid, isopropyl benzoic acid, ricinoleic acid, p-t-butylbenzoic acid, n-hexyl benzoic acid, salicyclic acid, naphthoic acid, 1-naphthalene acetic acid, orthobenzoyl benzoic acid, naphthenic acids derived from petroleum, abietic acid, dihydroabietic acid, and methyl furoic acid. These are used in the form of their metal salts, particularly the alkaline earth metal salts, such as magnesium, barium, strontium and calcium, and the zinc, cadmium, lead and tin salts. Where these salts are not known, they are made by the usual types of reaction, such as by mixing the acid, acid chloride or anhydride with the corresponding oxide or hydroxide of the metal in a liquid solvent, and heating, if necessary, until salt formation is complete. The barium, cadmium and zinc compounds are preferred.

There also can be employed either in conjunction with the above metal salts or in lieu thereof a polyvalent metal salt of a hydrocarbon-substituted phenol. The hydrocarbon substituent contains from four to twenty-four carbon atoms. The metal can be an alkaline earth metal or other polyvalent metal such as cadmium, lead, zinc and tin. Among such polyvalent metal phenolates there can be mentioned the magnesium, barium, calcium, strontium, cadmium, lead, tin and zinc salts of n-butyl phenol, isoamyl phenol, isooctyl phenol, 2-ethylhexyl phenol, t-nonyl phenol, n-decyl phenol, t-dodecyl phenol, t-octyl phenol, isohexyl phenol, octadecyl phenol, diisobutyl phenol, methyl propyl phenol, diamyl phenol, methyl isohexyl phenol, methyl t-octyl phenol, di-t-nonyl phenol, di-t-dodecyl phenol, ortho or para phenyl phenol. The metal phenolate should be soluble in the chlorine-containing resin and plasticizer mixture.

The combination of phosphorus acid, organic triphosphite and metal salt stabilizer constitute the essential stabilizers of the invention. The metal salt stabilizer can be metal organic acid salt or phenolate or a mixture of both.

Also effective stabilizers are organic compounds containing at least one epoxy group. These compounds may be used to supplement the essential stabilizers. The amount can range from 0 to 100 parts by weight per 100 parts of resin, depending upon the effect desired, for many epoxy compounds are also plasticizers for polyvinyl chloride resins, as will be noted in the discussion which follows.

Any epoxy compound can be used. The compounds can be aliphatic or cycloaliphatic in character, but aromatic, heterocyclic and alicyclic groups can also be present. The compounds have from 10 to 150 carbon atoms. The longer chain aliphatic compounds of 22 carbon atoms and more are also plasticizers. Typical epoxy compounds that are not plasticizers are epoxy carboxylic acids such as epoxy stearic acid, glycidyl ethers of polyhydric alcohols and phenols, such as tri-glycidyl glycerine, diglycidyl ether of diethylene glycol, glycidyl epoxy stearyl ether, 1,4-bis(2,3-epoxy propoxy) benzene, 4,4'-bis(2,3-epoxy propoxy) diphenyl ether, 1,8-bis(2,3-epoxy propoxy) octane, 1,4-bis(2,3-epoxy propoxy) cyclohexane, and 1,3-bis(4,5-epoxy pentoxy), 5-chlorobenzene, the epoxy polyethers of polyhydric phenols, obtained by reacting a polyhydric phenol with a halogen-containing epoxide or dihalohydrin, such as the reaction products of resorcinol, catechol, hydroquinone, methyl resorcinol or polynuclear phenols such as 2,2-bis(4-hydroxy phenyl) propane (Bisphenol A), 2,2-bis(4-hydroxy phenyl) butane, 4,4'-dihydroxybenzophenone and 1,5-dihydroxy naphthalene with halogen-containing epoxides such as 3-chloro-1,2-epoxy butane, 3-chloro-1,2-epoxy octane, and epichlorhydrine. Typical epoxy compounds that combine stabilizing with plasticizing action are listed below under plasticizers.

The invention is applicable to any polyvinyl chloride resin. The term "polyvinyl chloride" as used herein is inclusive not only of polyvinyl chloride homopolymers but also of copolymers of vinyl chloride in a major proportion and other copolymerizable monomers in a minor proportion, such as copolymers of vinyl chloride and vinyl acetate, copolymers of vinyl chloride and vinylidene chloride, copolymers of vinyl chloride with maleic or fumaric acid, and copolymers of vinyl chloride with styrene and also mixtures of polyvinylchloride in a major proportion with a minor proportion of other synthetic resins such as chlorinated polyethylene or a copolymer of acrylonitrile, butadiene and styrene.

There is incorporated usually a plasticizer for the resin, such as dioctyl phthalate, dioctyl sebacate and tricresyl phosphate.

Particularly useful plasticizers are the epoxy higher esters having from 22 to 150 carbon atoms. Such esters will initially have had unsaturation in the alcohol or acid portion of the molecule, which is taken up by the formation of the epoxy group.

Typical unsaturated acids are acrylic, oleic, linoleic, linolenic, euricic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethyl hexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerine is preferred. These alcohols may be fully or partially esterified with the epoxidized acid. Also useful are the epoxidized mixtures of higher fatty acid esters found in naturally-occurring oils such as epoxidized soybean oil, epoxidized glycerol trioleate, epoxidized cottonseed oil, epoxidized tall oil fatty acid esters, epoxidized coconut oil and epoxidized tallow. Of these, epoxidized soybean oil is preferred.

The alcohol can contain the epoxy group and have a long or short chain, and the acid can have a short or long chain, such as epoxy stearyl acetate, epoxy stearyl stearate, glycidyl stearate, and polymerized glycidyl methacrylate.

A small amount, usually not more than 1.5%, of a parting agent, also can be included. Typical parting agents are the higher aliphatic acids having from twelve to twenty-four carbon atoms such as stearic acid, lauric acid, palmitic acid and myristic acid, mineral lubricating oils, polyvinyl stearate, polyethylene and paraffin wax.

A total of from 0.5 to 10 parts by weight of the stabilizers other than the phosphorus acid, that is, the combination of the organic triphosphite and metal salt stabilizers, i.e., the phenolate and/or metal organic acid salt, is used for each 100 parts by weight of the resin. More stabilizer composition by weight of the polyvinyl chloride resin can be used, but no better result is obtained, and therefore such amounts are uneconomical and wasteful. The plasticizer can be used in an amount within the range of 0 to 100 parts by weight of the resin.

The preparation of the stabilized composition is easily accomplished by conventional procedures. The selected stabilizer combination ordinarily is mixed with the plasticizer, and this then is blended with the polyvinyl chloride resin, using, for instance, plastic mixing rollers, at a temperature at which the mix is fluid and thorough blending facilitated, milling the plasticizer and stabilizer with the resin on a 2-rol mill at from 250 to 350° F. for a time sufficient to form a homogeneous sheet, five minutes, usually. After the mass is uniform, it is sheeted in the usual way.

The following examples in the opinion of the inventors constitute preferred embodiments of their invention.

EXAMPLE 1

A series of formulations was prepared having the following composition:

| Plastic composition: | Parts by weight |
|---|---|
| Geon 101 EP (homopolymer of polyvinyl chloride) | 100 |
| Dioctyl phthalate | 45 |
| Epoxidized 2-ethylhexyl ester of tall oil fatty acids | 5 |
| Cadmium-2-ethyl-hexoate | 0.75 |
| Stearic acid | 0.25 |
| Phosphite stabilizer combination as noted in Table I | 0.75 |

The dioctyl phthalate, cadmium-2-ethyl hexoate, stearic acid, epoxidized tall oil fatty acid esters and phosphite stabilizer were mixed together and then blended with the polyvinyl chloride. The mixture was heated on a 2-roll mill up to 350° F. and then tested in an oven at 350° F. for heat stability. The discoloration was noted and is reported in Table I below.

Table I

| Time of heating | A<br>Triphenyl phosphite | B<br>0.5 part triphenyl phosphite; 0.25 part diphenyl phosphite | C<br>Isooctyl diphenyl phosphite | D<br>0.5 part isooctyl diphenyl phosphite; 0.25 part diphenyl phosphite | E<br>0.25 part triphenyl phosphite; 0.25 part isooctyl diphenyl phosphite; 0.25 part diphenyl phosphite |
|---|---|---|---|---|---|
| Initial | Slight yellow discoloration. | No discoloration | No discoloration | No discoloration | No discoloration. |
| 15 | do | do | do | do | Do. |
| 30 | Slightly intensified yellow discoloration. | do | Slight yellow discoloration. | do | Do. |
| 45 | do | Slight yellow discoloration. | Intensified yellow discoloration. | do | Do. |
| 60 | Distinct yellow discoloration. | do | Yellow, slight scorching around edges. | Slight yellow discoloration. | Faint yellow discoloration. |
| 75 | Yellow with scorching around edges. | Intensified yellow discoloration. | Deep yellow, scorching around edges. | Faint yellow, slight scorching around edges. | Faint yellow, slight scorching around edges. |
| 90 | Brown | Yellow, slight scorching around edges. | Brown | Light yellow, scorching around edges. | Light yellow, slight scorching around edges. |
| 105 | Dark brown | Yellow, scorching around edges. | Dark brown | Yellow, scorching around edges. | Yellow, scorching around edges. |
| 120 | do | Badly discolored | do | Badly discolored | Badly discolored. |

It is apparent from the above results that the diphenyl phosphite gave a distinct improvement in preventing initial discoloration and also discoloration during the first thirty minutes of heating. Thereafter discoloration proceeded as in the case of the other stabilizers, but a better heat stability was evident, since serious discoloration did not begin until after 75 minutes of heating as compared with 45 minutes of heating for compositions A and C.

The compositions containing diphenyl phosphite also had better clarity, and they did not plate out on the rolls of the mill.

EXAMPLE 2

A series of compositions was made up of the following formulation:

Plastic composition: Parts by weight
Geon 101 EP (homopolymer of polyvinyl chloride) _____ 100
Dioctyl phthalate _____ 45
Epoxidized isooctyl ester of tall oil fatty acids __ 5
Cadmium-2-ethyl-hexoate _____ 0.75
Stearic acid _____ 0.25
Stabilizer noted in Table II _____ 0.75

The dioctyl phthalate, cadmium-2-ethyl hexoate, stearic acid, epoxidized tall oil fatty acid esters and stabilizer were mixed together and then blended with the polyvinyl chloride. The mixture was heated on a 2-roll mill up to 350° F. and then tested in the oven at 350° F. for heat stability. The discoloration was noted and is reported in Table II below.

Table II

| Time of heating | F<br>Triphenyl phosphite | G<br>0.5 part triphenyl phosphite; 0.25 part diphenyl phosphite |
|---|---|---|
| Initial | Faint yellow discoloration | No discoloration. |
| 15 | do | Do. |
| 30 | do | Do. |
| 45 | Distinct yellow color | Do. |
| 60 | do | Faint yellow discoloration. |
| 75 | Yellow with scorching around edges. | Do. |
| 90 | Brown | Yellow discoloration. |
| 105 | | Yellow discoloration with scorching around edges. |
| 120 | | Dark brown. |

The addition of diphenyl phosphite makes it possible to avoid initial discoloration and delay development of yellow discoloration for the first forty-five minutes of heating. Even after one hour of heating, the discoloration is so slight as to be clearly preferable, as compared with the triphenyl phosphite alone.

The diphenyl phosphite also improved the clarity of the composition, and the composition did not plate out on the rolls of the mill during mixing.

EXAMPLE 3

A series of compositions was prepared having the following formulation:

Plastic composition: Parts by weight
Geon 101 EP (homopolymer of polyvinyl chloride) _____ 100
Dioctyl phthalate _____ 50
Barium laurate _____ 1.2
Cadmium laurate _____ 0.8
Triphenyl phosphite _____ 0.5
Diphenyl phosphite—0 to 0.25 part as noted in Table III.

The dioctyl phthalate, barium laurate, cadmium laurate, triphenyl phosphite and diphenyl phosphite were mixed together and then blended with the polyvinyl chloride. The mixture was heated on a 2-roll mill up to 350° F. and then tested in an oven at 350° F. for heat stability. The discoloration was noted and is reported in Table III below.

Table III

| Time of heating | Control—No diphenyl phosphite | J<br>0.1 part diphenyl phosphite | K<br>0.25 part diphenyl phosphite |
|---|---|---|---|
| Initial | Slight yellow discoloration. | Clear, no discoloration. | Clear, no discoloration. |
| 15 | Yellow discoloration intensified. | do | Do. |
| 30 | do | Faint yellow tint | Clear. |
| 45 | do | do | Faint yellow tint. |
| 60 | Definite yellow tint | do | Do. |
| 75 | do | do | Do. |
| 90 | Yellow | do | Do. |
| 105 | do | do | Do. |
| 120 | do | Light yellow | Light yellow. |

The above data show that the diphenyl phosphite eliminates the initial yellow discoloration which is introduced during milling noted in the control. The larger amount of diphenyl phosphite gives a slightly better heat stability.

The diphenyl phosphite also gave a clearer composition.

EXAMPLE 4

A group of formulations was prepared having the following composition:

Plastic composition: Parts by weight
VC-100 (polyvinyl chloride homopolymer) __ 100
Dioctyl phthalate _____ 37
Epoxidized isooctyl ester of tall oil fatty acids _____ 8
Stearic acid _____ 0.2
Barium nonyl phenate _____ 0.360
Cadmium-2-ethyl-hexoate _____ 0.180
Zinc-2-ethyl-hexoate _____ 0.266
2-ethyl hexyl diphenyl phosphite _____ 0.180
Acid phosphite as noted in Table IV _____ 0.1

The dioctyl phthalate, stearic acid, epoxidized isooctyl ester of tall oil fatty acids, barium nonyl phenate, cadmium-2-ethyl-hexoate, zinc-2-ethyl-hexoate, 2-ethyl hexyl diphenyl phosphite and acid phosphite were mixed together and then blended with the polyvinyl chloride. The mixture was heated on a 2-roll mill up to 350° F. and then tested in an oven at 350° F. for heat stability. The discoloration was noted and is reported in Table IV below.

The above data show that stearic acid is not effective as a stabilizer. The isooctyl diphenyl phosphite gives an improvement over the control in long term heat stability, but not in initial color.

The di-n-butyl phosphite and the diphenyl phosphite improve the initial color, clarity and the resistance to discoloration up to approximately thirty minutes of heating.

Controls B and C plated out badly on the rolls of the

*Table IV*

| Time of heating | Control A—No acid phosphite | Control B [1]—No acid phosphite | Control C [2]—No acid phosphite | L — Diphenyl phosphite | M — Di-n-butyl phosphite |
|---|---|---|---|---|---|
| Initial | Very slight discoloration | Slight yellow tint | Slight yellow tint | No discoloration | No discoloration. |
| 15 | Slight yellow tint | ----do---- | ----do---- | ----do---- | Do. |
| 30 | Intensified yellow tint | ----do---- | Intensified yellow tint | ----do---- | Do. |
| 45 | Yellow tint | ----do---- | Yellow tint | Faint yellow discoloration | Faint yellow discoloration. |
| 60 | ----do---- | ----do---- | ----do---- | ----do---- | Do. |
| 75 | Yellow | Yellow tint | Yellow | Yellow tint | Yellow tint. |
| 90 | ----do---- | Yellow | ----do---- | Yellow | Yellow. |
| 105 | Yellow with charred edges. | Yellow with charred edges | Yellow with charred edges | ----do---- | Do. |
| 120 | Badly charred | Badly decomposed | Badly decomposed | ----do---- | Yellow with charred edges. |

[1] Plus 0.1 part additional isooctyl diphenyl phosphite.
[2] Plus 0.1 part additional stearic acid.

The improvement obtained by the addition of diphenyl or di-n-butyl phosphite is evident from the data. Not only is the initial color improved, but the resistance to discoloration is also considerably improved. This improvement is not obtainable by raising the acidity with more stearic acid or increasing the phosphorus content with more isooctyl diphenyl phosphite.

The diphenyl and di-n-butyl phosphites also improved the clarity of the composition, and no plate-out occurred on the rolls of the mill.

EXAMPLE 5

A group of compositions was prepared according to the following formulation:

Plastic composition:                Parts by weight
    Geon 101 EP (homopolymer of polyvinyl chloride) ------------------------ 100
    Dioctyl phthalate ------------------------ 50
    Barium nonyl phenate ------------------------ 0.5
    Cadmium-2-ethyl-hexoate ------------------------ 0.25
    Triphenyl phosphite ------------------------ 0.25
    Supplemental stabilizer as noted in Table V ------------------------ 0.1

The dioctyl phthalate, barium nonyl phenate, cadmium-2-ethyl-hexoate, triphenyl phosphite and supplemental stabilizer were mixed together and then blended with the polyvinyl chloride. The mixture was heated on a 2-roll mill up to 350° F. and then tested in an oven at 350° F. for heat stability. The discoloration was noted and is reported in Table V below.

mill, but the diphenyl phosphite overcame this difficulty. The di-n-butyl phosphite composition gave a negligible amount of plate-out.

EXAMPLE 6

A group of compositions was prepared employing a variety of different phosphorus acids using the following basic formulation:

Plastic composition:                Parts by weight
    VC-100 (polyvinyl chloride homopolymer) ------ 100
    Dioctyl phthalate ------------------------ 37
    Epoxidized isooctyl ester of tall oil fatty acid ------ 8
    Barium nonyl phenate ------------------------ 0.360
    Cadmium-2-ethyl-hexoate ------------------------ 0.180
    Isooctyl diphenyl phosphite ------------------------ 0.180
    Zinc-2-ethyl-hexoate ------------------------ 0.266
    Stearic acid ------------------------ 0.2
    Phosphorus acid as noted in Tables VI and VII.

The dioctyl phthalate, epoxidized isooctyl ester of tall oil fatty acid, barium nonyl phenate, cadmium-2-ethyl-hexoate, isooctyl diphenyl phosphite, zinc-2-ethyl hexoate, stearic acid and phosphorus acid were mixed together and then blended with the polyvinyl chloride. The mixture was heated on a 2-roll mill up to 350° F. and tested in the oven at 350° F. for heat stability. The discoloration was noted and is reported in Tables VI and VII below.

*Table V*

| Time of heating | Control A | Control B—Stearic acid | Control C—Isooctyl diphenyl phosphite | N — Diphenyl phosphite | O — Di-n-butyl phosphite |
|---|---|---|---|---|---|
| Initial | Faint yellow discoloration | Faint yellow discoloration | Faint yellow discoloration. | Clear, no discoloration | Clear, no discoloration. |
| 15 | Intensified yellow discoloration. | Intensified yellow discoloration. | ----do---- | ----do---- | Do. |
| 30 | ----do---- | ----do---- | ----do---- | Faint yellow discoloration | Faint yellow discoloration. |
| 45 | ----do---- | ----do---- | Pale yellow discoloration. | Yellowish tint | Yellowish tint. |
| 60 | Yellow | Yellow | Yellow | Yellow | Yellow. |
| 75 | Badly decomposed | Badly decomposed | Badly decomposed | Badly decomposed | Badly decomposed. |
| 90 | ----do---- | ----do---- | ----do---- | ----do---- | Do. |
| 105 | ----do---- | ----do---- | ----do---- | ----do---- | Do. |
| 120 | ----do---- | ----do---- | ----do---- | ----do---- | Do. |

Table VI

| Time of heating | Control | P 0.05 part phosphorous acid | Q 0.1 part phosphorous acid | R 0.05 part phosphoric acid | S 0.1 part phosphoric acid | T 0.05 part monophenyl phosphite | U 0.1 part monophenyl phosphite |
|---|---|---|---|---|---|---|---|
| Initial | Slight discoloration. | No discoloration. | No discoloration. | No discoloration. | Faint yellow tint. | Clear, no discoloration. | Clear, no discoloration. |
| 15 | Definite yellow tint. | do | Yellowish tint. | do | Deep yellow. | do | No discoloration. |
| 30 | Intensified yellow tint. | Barely perceptible yellow tint. | Pale yellow. | do | Very deep yellow. | Barely perceptible yellow tint. | Do. |
| 45 | do | do | do | Barely perceptible yellow tint. | Light brown. | do | Barely perceptible yellow tint. |
| 60 | do | Yellowish tint. | Yellow. | do | do | do | Do. |
| 75 | do | do | Deep yellow. | Faint yellow tint. | do | do | Faint yellow. |
| 90 | Pale yellow. | do | Very deep yellow. | do | do | Pale yellow. | Pale yellow. |
| 105 | Yellow. | Pale yellow. | do | Yellow. | do | do | Do. |
| 120 | Deep yellow with charred edges. | Yellow. | do | Yellow with charred edges. | do | Yellow. | Yellow. |

Table VII

| Time of heating | V 0.05 part monoisooctyl acid orthophosphate | W 0.1 part monoisooctyl acid orthophosphate | X 0.05 part benzene phosphinic acid | Y 0.1 part benzene phosphinic acid | Z 0.05 part benzene phosphonic acid | ZZ 0.1 part benzene phosphonic acid |
|---|---|---|---|---|---|---|
| Initial | No discoloration. | No discoloration. | No discoloration. | No discoloration. | No discoloration. | No discoloration. |
| 15 | do | do | Barely perceptible yellow tint. | do | Barely perceptible yellow tint. | Do. |
| 30 | Barely perceptible yellow tint. | do | Faint yellow tint. | do | do | Do. |
| 45 | do | Barely perceptible yellow tint. | do | Faint yellow tint. | Faint yellow tint. | Faint yellow tint. |
| 60 | do | do | do | do | do | Do. |
| 75 | do | do | Yellow tint. | Yellow tint. | do | Yellow tint. |
| 90 | Faint yellow tint. | Faint yellow tint. | Pale yellow. | Pale yellow. | Faint yellow. | Pale yellow. |
| 105 | Yellow tint. | Yellow tint. | Yellow. | Yellow. | Pale yellow. | Yellow. |
| 120 | Yellow. | Yellow. | do | do | Yellow. | Do. |

The data show that phosphorous acid and phosphoric acid are capable of avoiding initial discoloration and the development of yellow color during the early stages of heating, but only if they are used in amounts below 0.1 part per part of resin. At the larger amounts, the stabilizer introduces a yellowish discoloration which is pronounced. The monophenyl phosphite, the isooctyl acid phosphate, benzene phosphinic and benzene phosphonic acids do not have this disability, presumably due to the lower acidity of the organic phosphites, phosphates, phosphinic and phosphonic acids, as compared to the inorganic acids.

The control plated out badly on the rolls of the mill. The monophenyl phosphite, monooctyl acid orthophosphate and benzene phosphinic acid overcame this entirely. The benzene phosphonic acid, phosphorous acid, and phosphoric acid reduced plate-out substantially.

In any of the above examples, similar results have been obtained with vinyl chloride copolymer resin such as the copolymer of 96% vinyl chloride and 4% vinyl acetate.

We claim:

1. In a polyvinyl chloride resin stabilizer capable of improving the resistance of the resin to discoloration when heated at 350° F. comprising an organic triphosphite having the formula

wherein $R_1$, $R_2$ and $R_3$ are organic hydrocarbon radicals having from about one to about twenty atoms, and at least one stabilizer selected from the group consisting of polyvalent metal salts of hydrocarbon-substituted phenols, the hydrocarbon group having from about four to about twenty-four carbon atoms, and polyvalent metal salts of organic carboxylic acids containing from about six to about eighteen carbon atoms, the improvement which comprises the combination therewith of phosphorus acid having at least one hydrogen atom of acidic character.

2. A polyvinyl chloride resin stabilizer in accordance with claim 1 in which the phosphorus acid is an acid ester of phosphorous acid.

3. A polyvinyl chloride resin stabilizer in accordance with claim 1 in which the phosphorus acid is an acid ester of phosphoric acid.

4. A polyvinyl chloride resin stabilizer in accordance with claim 1 in which the phosphorus acid is an organic phosphinic acid.

5. A polyvinyl chloride resin stabilizer in accordance with claim 1 in which the phosphorus acid is an organic phosphonic acid.

6. A polyvinyl chloride resin stabilizer in accordance with claim 1 in which phosphorus acid is an inorganic phosphorus acid.

7. In a polyvinyl chloride resin composition having improved resistance to discoloration when heated at 350° F., comprising a polyvinyl chloride resin, an organic triphosphite having the formula

wherein $R_1$, $R_2$ and $R_3$ are organic hydrocarbon radicals having from about one to about twenty atoms and a stabilizer selected from the group consisting of polyvalent metal salts of hydrocarbon-substituted phenols, the hydrocarbon group having from about four to about twenty-four carbon atoms, and polyvalent metal salts of organic carboxylic acids containing from about six to about eighteen carbon atoms, the improvement which comprises the combination therewith of a phosphorus acid having at least one hydrogen atom of acidic character, in an amount sufficient to improve the initial color but less than will impart discoloration to the resin.

8. A polyvinyl chloride resin composition in accordance with claim 7 which also includes an organic epoxy compound having from 10 to 150 carbon atoms.

9. A polyvinyl chloride resin composition in accordance with claim 8 in which the epoxy compound is an epoxy ester having from 22 to 150 carbon atoms.

10. A polyvinyl chloride resin composition in accordance with claim 7 in which phosphorus acid is an acid ester of phosphorous acid.

11. A polyvinyl chloride resin composition in accordance with claim 7 in which the phosphorus acid is an acid ester of phosphoric acid.

12. A polyvinyl chloride resin composition in accordance with claim 7 in which the phosphorus acid is an organic phosphinic acid.

13. A polyvinyl chloride resin composition in accordance with claim 7 in which the phosphorus acid is an organic phosphonic acid.

14. A polyvinyl chloride resin composition in accordance with claim 7 in which the phosphorus acid is an inorganic phosphorus acid.

15. A polyvinyl chloride resin composition in accordance with claim 7 in which the polyvinyl chloride resin is a polyvinyl chloride homopolymer.

16. A process for improving the resistance to discoloration when heated at 350° F. of a polyvinyl chloride resin comprising an organic triphosphite having the formula:

wherein $R_1$, $R_2$ and $R_3$ are organic hydrocarbon radicals having from about one to about twenty atoms, and at least one stabilizer selected from the group consisting of polyvalent metal salts of hydrocarbon-substituted phenols, the hydrocarbon group having from about four to about twenty-four carbon atoms, and polyvalent metal salts of organic carboxylic acids containing from about six to about eighteen carbon atoms, which comprises incorporating in the said resin a phosphorus acid having at least one hydrogen atom of acidic character in an amount sufficient to improve the initial color but less than will impart discoloration to the resin.

17. A process in accordance with claim 16 in which the phosphorus acid is an acid ester of phosphorous acid.

18. A process in accordance with claim 16 in which the phosphorus acid is an acid ester of phosphoric acid.

19. A process in accordance with claim 16 in which the phosphorus acid is an organic phosphinic acid.

20. A process in accordance with claim 16 in which the phosphorus acid is an organic phosphonic acid.

21. A process in accordance with claim 16 in which the phosphorus acid is an inorganic phosphorus acid.

References Cited in the file of this patent

UNITED STATES PATENTS

| | | |
|---|---|---|
| 2,230,371 | Bolton | Feb. 4, 1941 |
| 2,868,765 | Haefner et al. | Jan. 13, 1959 |
| 2,894,923 | Graham | July 14, 1959 |

UNITED STATES PATENT OFFICE
CERTIFICATION OF CORRECTION

August 22, 1961

Patent No. 2,997,454

William E. Leistner et al.

It is hereby certified that error appears in the above numbered patent requiring correction and that the said Letters Patent should read as corrected below.

Column 2, lines 69 to 71, formula (VII) should appear as shown below instead of as in the patent:

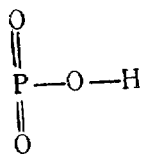

column 3, line 22, for "dipenyl" read -- diphenyl --; line 27, for "di(dimetylphenyl)" read -- di(dimethylphenyl) --; line 37, for "di(2-phenyl ethyl(" read -- di(2-phenyl ethyl) --; column 4, line 59, for "salicyclic" read -- salicylic --; column 6, line 2, for "euricic" read -- erucic --; line 41, for "of", first occurrence, read -- from --; same column 6, line 49, for "2-rol" read -- 2-roll --; columns 7 and 8, Table I, column 3, line 9 thereof, for "schorching" read -- scorching --; column 11, line 73, after "of" insert -- a --; column 12, line 48, and column 13, line 2, after "which", each occurrence, insert -- the --.

Signed and sealed this 20th day of March 1962.

(SEAL)
Attest:

ERNEST W. SWIDER
Attesting Officer

DAVID L. LADD
Commissioner of Patents